(12) United States Patent
Ejiri

(10) Patent No.: US 6,357,339 B1
(45) Date of Patent: Mar. 19, 2002

(54) MULTI-STAGE PISTON ACTUATOR

(75) Inventor: Takashi Ejiri, Tokyo (JP)

(73) Assignee: Fujikura Rubber Ltd., Tokyo (JP)

( * ) Notice: Subject to any disclaimer, the term of this patent is extended or adjusted under 35 U.S.C. 154(b) by 0 days.

(21) Appl. No.: 09/615,985

(22) Filed: Jul. 14, 2000

(30) Foreign Application Priority Data

Jul. 16, 1999 (JP) .......................................... 11-202740

(51) Int. Cl.⁷ ................................................. F01B 7/00
(52) U.S. Cl. ...................................... 92/150; 251/6.35
(58) Field of Search ............................... 92/61, 62, 65, 92/150; 251/63.5

(56) References Cited

U.S. PATENT DOCUMENTS 5,906,353 A * 5/1999 Someya et al. ............ 251/63.5
6,179,003 B1 * 1/2001 Burmester ................. 251/63.5
6,186,163 B1 * 2/2001 Borg ......................... 251/63.5

* cited by examiner

*Primary Examiner*—Edward K. Look
*Assistant Examiner*—Igor Kershteyn
(74) *Attorney, Agent, or Firm*—McCormick, Paulding & Huber LLP

(57) ABSTRACT

A multi-stage piston actuator includes an operation stem, a plurality of pistons provided on the operation stem at different axial positions, a cylinder in which the pistons are slidably fitted, and a separation wall provided within the cylinder, which defines pressure chambers corresponding to the pistons. The separation wall is made of a cup-shaped member which is provided with a central cylindrical portion in which the operation stem slides, a peripheral cylindrical portion which is fitted in and secured to an inner wall surface of the cylinder, and a circular disc portion which connects the central cylindrical portion and the peripheral cylindrical portion.

8 Claims, 4 Drawing Sheets

MULTI-STAGE PISTON ACTUATOR

BACKGROUND OF THE INVENTION

1. Field of the Invention

The present invention relates to a multi-stage piston actuator in which a single stem is provided with a plurality of pistons and, in particular, it relates to a separation wall structure within a cylinder thereof.

2. Description of the Related Art

A known multi-stage piston actuator is used as, for example, a multi-stage piston valve in which an increased valve opening or closing force can be obtained from a small valve opening or closing pressure. In such a multi-stage piston valve, a plurality of chambers corresponding to the pistons are formed by a separation wall or walls in a cylinder, so that valve opening or closing pressure is applied to each chamber.

In general, the separation wall within the cylinder of the multi-stage piston valve is in the form of a piston-like separation wall which is fitted in, and secured to, the cylinder, or in the form of an integral separation wall integrally formed with the cylinder which is split into a plurality of cylinder sections by cutting the cylinder sections. However, the manufacturing cost of the piston-like separation wall and the integral separation wall is high, and it is difficult to make the multi-stage piston valve thin or small. Moreover, the piston-like separation wall fitted in the cylinder requires a special seal member, such as an O-ring to establish a fluid-tight connection between the separation wall and the inner wall surface of the cylinder.

SUMMARY OF THE INVENTION

It is an object of the present invention to eliminate the above-mentioned drawbacks of the prior art by providing a small, thin and inexpensive multi-stage piston actuator.

To achieve the object mentioned above, according to the present invention, a multi-stage piston actuator is provided, including an operation stem, a plurality of pistons provided on the operation stem at different axial positions, a cylinder in which the pistons are slidably fitted, and a separation wall provided within the cylinder, which defines pressure chambers corresponding to the pistons. The separation wall is made of a cup-shaped member which is provided with a central cylindrical portion in which the operation stem slides, a peripheral cylindrical portion which is fitted in, and secured to, an inner wall surface of the cylinder, and a circular disc portion which connects the central cylindrical portion and the peripheral cylindrical portion.

Preferably, the peripheral cylindrical portion of the cup-shaped separation wall member and the inner wall surface of the cylinder are snugly fitted without a seal member therebetween, so that no air leakage occurs between the peripheral cylindrical portion of the cup-shaped separation wall member and the inner wall surface of the cylinder.

According to another aspect of the present invention, a double-piston actuator is provided, including a cylinder having of a pair of cylinder bodies; a separation wall provided within and between the cylinder bodies, the separation wall defining a pair of pressure chambers within the cylinder; an operation stem located in the axial position of the cylinder; and a pair of pistons provided on the operation stem at different axial positions, each of the pair of pistons being slidably fitted in each respective pair of pressure chambers. The separation wall is made of a cup-shaped member which is provided with a central cylindrical portion in which the operation stem slides, a peripheral cylindrical portion which is secured between the pair of cylinder bodies, and a circular disc portion which connects the central cylindrical portion and the peripheral cylindrical portion.

Preferably, the peripheral cylindrical portion of the cup-shaped separation wall member and the inner wall surface of one of the cylinder bodies are snugly fitted without a seal member therebetween, so that no air leakage occurs between the peripheral cylindrical portion of the cup-shaped separation wall member and the inner wall surface of the cylinder body.

The cup-shaped separation wall member can be formed by press forming sheet metal or by cutting a metal material.

The present disclosure relates to subject matter contained in Japanese Patent Application No. 11-202740 (filed on Jul. 16, 1999) which is expressly incorporated herein by reference in its entirety.

BRIEF DESCRIPTION OF THE DRAWINGS

The invention will be described below in detail, with reference to the accompanying drawings, in which.

DESCRIPTION OF THE PREFERRED EMBODIMENT

Figure 1:
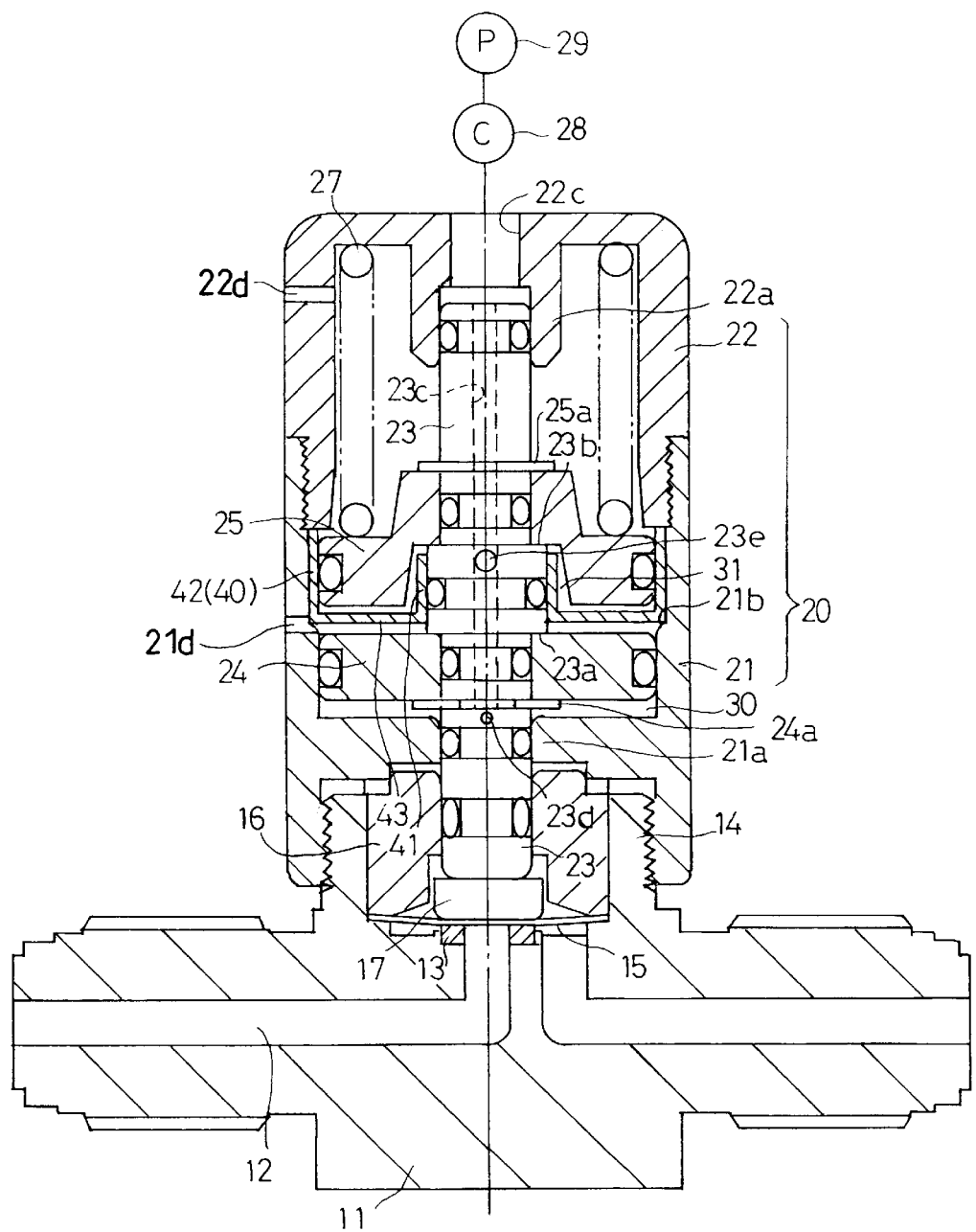
FIG. 1 is a longitudinal sectional view of an embodiment of the present invention in which a multi-stage piston actuator is applied to a multi-stage piston valve.
Figure 2:
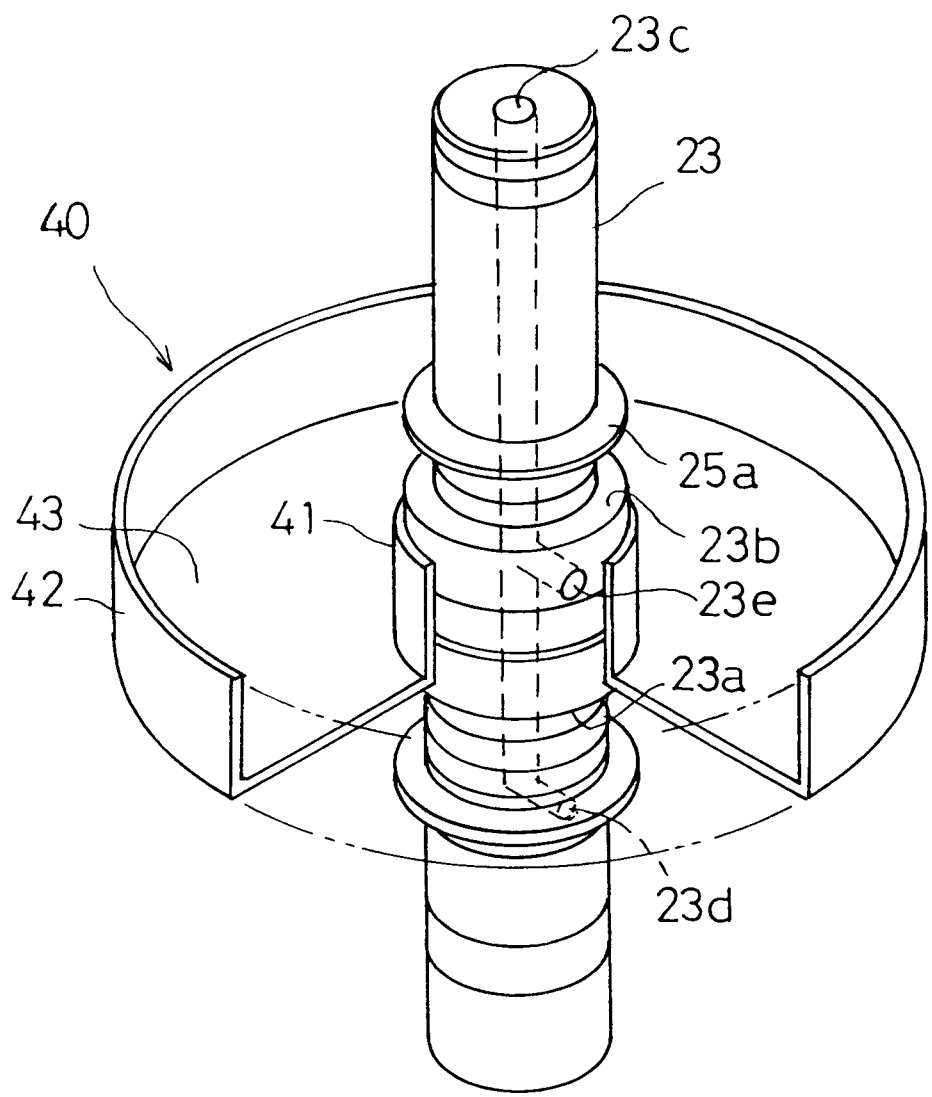
FIG. 2 is a perspective view of a separation wall portion in a multi-stage piston actuator shown in FIG. 1.

The illustrated embodiments are applied to a normally-closed type multi-stage piston valve. FIGS. 1 and 2 show a first embodiment of the present invention. A passage block 11 located in the lower part of FIG. 1 is provided therein with a fluid passage 12 in which an annular valve seat 13 having an upright axis is formed. The passage block 11 is provided with a cylindrical connecting portion 14 coaxial to the annular valve seat 13. Inserted into the cylindrical connecting portion 14 are a metal diaphragm 15 in the form of a circular disc to open or close the annular valve seat 13, a retainer 16 which presses the metal diaphragm 15 against the passage block 11 at the peripheral edge of the metal diaphragm 15, and a pressing member 17 which is located on the opposite side to the annular valve seat 13 with respect to the metal diaphragm 15.

A cylinder 20 is screwed onto the outer peripheral surface of the cylindrical connecting portion 14. The cylinder 20 is includes a lower cylinder body 21 which is screwed onto the outer peripheral surface of the cylindrical connecting portion 14, and an upper cylinder body 22 which is screwed in the upper end of the lower cylinder body 21. The retainer 16 is secured to the passage block 11 by the lower cylinder body 21. The valve stem (operation stem) 23 is slidably supported by a center hole of the lower end wall 21a of the lower cylinder body 21 and by an upper small diameter portion 22a of the upper cylinder body 22. The lower end of the valve stem 23 extends through the center hole of the retainer 16 and abuts against the upper surface of the pressing member 17.

The valve stem 23 is provided with two pistons 24 and 25 secured thereto at different axial positions. Namely, the lower piston 24 is secured to the valve stem 23 by a stepped portion 23a of the valve stem 23 and a slip-off prevention ring 24a. The upper piston 25 is secured to the valve stem 23 by a stepped portion 23b of the valve stem 23 and a slip-off prevention ring 25a. A compression spring 27 is inserted between the piston 25 and the valve stem 23 to bias the piston 25 (valve stem 23) downwardly, as shown for example in FIG. 1, so that the valve stem 23 normally seats the metal diaphragm 15 onto the annular valve seat 13 via the pressing member 17 due to the spring force of the compression spring 27 (i.e., the fluid passage 12 is normally closed).

Pressure chambers 30 and 31 are defined in the cylinder 20 by the pistons 24 and 25 to move the valve stem 23 into an open position against the compression spring 27. The lower pressure chamber 30 is formed underneath the piston 24 by the lower cylinder body 21, the lower end wall 21a and the piston 24. The upper pressure chamber 31 is formed underneath the piston 25 by a cup-shaped separation wall member (separation wall) 40 fitted in the cylinder 20 and the piston 25.

The cup-shaped separation wall member 40 includes a central cylindrical portion 41 in which the valve stem 23 slides, a peripheral cylindrical portion 42 fitted in and secured to the inner wall of the cylinder 20, and a circular disc portion 43 which connects the central cylindrical portion 41 and the peripheral cylindrical portion 42. The peripheral cylindrical portion 42 is snugly fitted in the inner wall of the cylinder 20 without a seal member therebetween so that no air leakage occurs between the peripheral cylindrical portion of the cup-shaped separation wall member and the inner wall surface of the cylinder. As can be seen in FIG. 1, the peripheral cylindrical portion 42 is held between the stepped portion 21b of the lower cylinder body 21 and the lower end of the upper cylinder body 22 and is secured to the cylinder 20 so as not to move in the axial direction. It is not necessary to secure the separation wall member 40 to the cylinder 20 if the extremity of the movement of the upper end of the valve stem 23 or the upper end of the piston 25 is restricted in the upper cylinder body 22. The cup-shaped separation wall member 40 can be formed by press forming (drawing) sheet metal or cutting a metal material. Preferably, the separation wall member 40 is formed by pressing a metal sheet to achieve a low manufacturing cost.

The valve stem 23 is provided with an axial hole 23c connected to a pressure port 22c of the upper cylinder body 22. The axial hole 23c is connected to radial holes 23d and 23e which are in turn connected to the pressure chambers 30 and 31, respectively. The pressure port 22c is connected to a pilot pressure source 29 through a control valve 28. Air ports 21d and 22d are formed in the lower and upper cylinder bodies 21 and 22 of the cylinder 20 to connect the chambers defined above the pistons 24 and 25 to the atmosphere, respectively.

In the multi-stage piston valve constructed as above, when no pilot pressure is introduced into the pressure port 22c, the valve stem 23 seats the metal diaphragm 15 onto the annular valve seat 13 through the pressing member 17 due to the spring force of the compression spring 27 to thereby close the fluid passage 12. In this state, if the pilot pressure is supplied from the pilot pressure source 29 into the pressure port 22c through the control valve 28, the pilot pressure is introduced into the pressure chambers 30 and 31 through the axial hole 23c and the radial holes 23d, 23e of the valve stem 23. Consequently, an upward force is applied to the valve stem 23 against the compression spring 27 through the pistons 24 and 25. If the resultant upward force exceeds the spring force of the compression spring 27, upward movement of the valve stem 23 occurs. As a result, the metal diaphragm 15 is elastically deformed due to the fluid pressure of the fluid passing in the fluid passage 12 and is disengaged from the annular valve seat 13, so that the fluid passage is open. Since the two pistons 24 and 25 are provided on the single valve stem 23, the valve opening force is produced by the resultant force of the two pistons. Thus, a large valve opening force can be obtained from a small valve opening pressure.

The embodiment described above has been directed to a normal operation of a normally closed type multi-stage piston valve. One of the most significant features of the illustrated embodiment resides in the cup-shaped separation wall member 40 which defines the pressure chamber 31 in the cylinder 20. The cup-shaped separation wall member 40 makes it possible to form the pressure chamber 31 in the cylinder 20 by the simple structure and shape and contributes to a realization of a small and thin piston valve.

Figure 3:
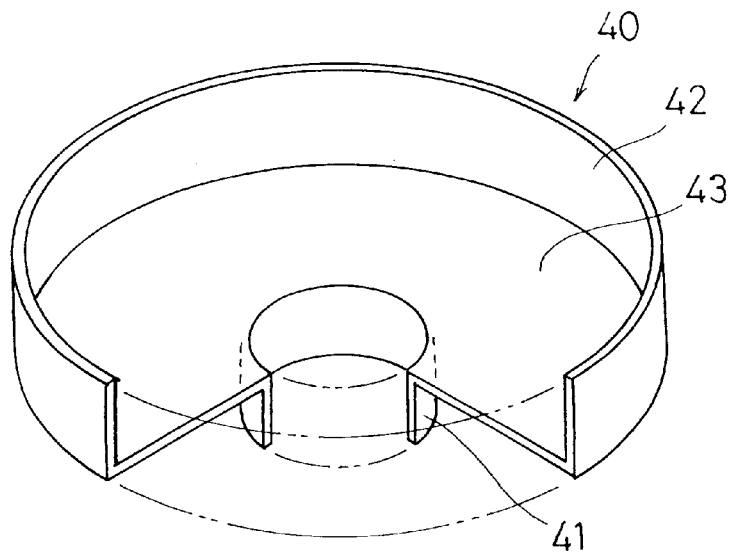
FIG. 3 is a perspective view of another embodiment of a separation wall structure.
Figure 4:
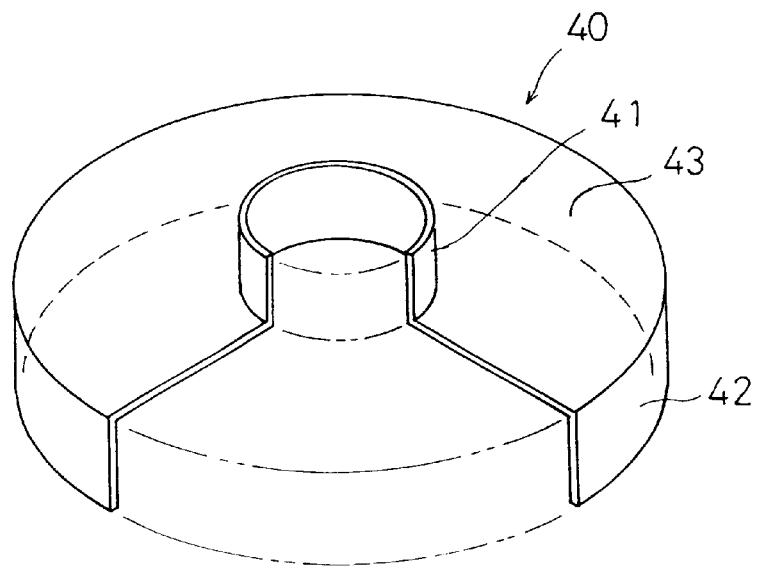
FIG. 4 is a perspective view of another embodiment of a separation wall structure.
Figure 5:
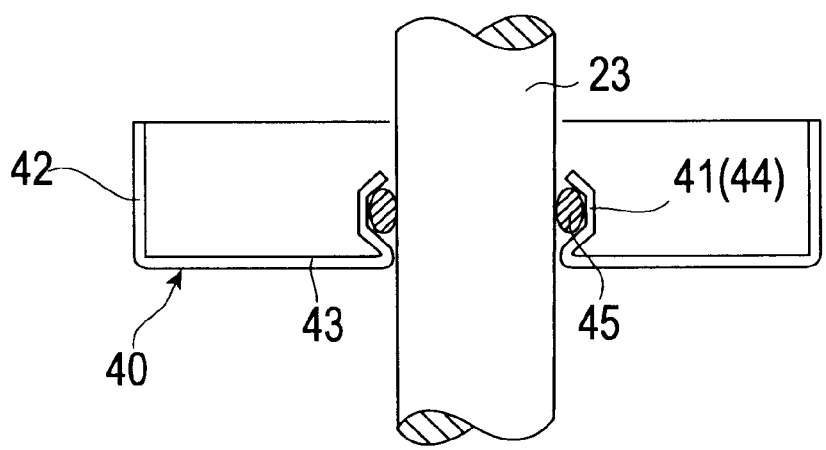
FIG. 5 is a sectional view of another embodiment of a separation wall structure.

FIGS. 3 and 4 show different embodiments of the cup-shaped separation wall member 40. In the embodiments shown in FIGS. 3 and 4, the directions of the central cylindrical portion 41 and the peripheral cylindrical portion 42 are different from those in the first embodiment shown in FIGS. 1 and 2. Namely, in FIGS. 3 and 4, the central cylindrical portion 41 extends in a direction opposite to the direction of the peripheral cylindrical portion 42. The cup-shaped separation wall member 40 can be provided within the cylinder 20 in the direction shown in FIG. 3, or in the opposite direction thereof shown in FIG. 4. Moreover, in an arrangement illustrated in FIG. 5, the central cylindrical portion 41 shown in FIG. 2 is provided with a holder portion 44 which holds a seal member (O ring) 45 between the valve stem 23 and the central cylindrical portion 41. The modified embodiments shown in FIGS. 3, 4 and 5 can be selectively and appropriately used, depending on the shape or structure of the cylinder 20 and the pistons 24 and 25, etc.

Although the above-mentioned embodiments are applied to a normally-closed multi-stage piston valve, the present invention can be equally applied to a normally-open multi-stage piston valve in which the valve stem is biased in a direction to open the fluid passage. Furthermore, although the valve stem 23 presses the metal diaphragm 15 that opens or closes the annular valve seat 13 in the illustrated embodiments, the present invention can be applied to a metal bellows valve, or a valve structure in which the valve body is directly provided on the lower end of the valve stem 23, or a valve structure in which the movement of the valve stem 23 is transmitted to a valve body separate from the valve stem. In addition to the foregoing, the present invention can be used as a multi-stage piston actuator in which an operation other than the valve opening and closing operation is carried out by the valve stem 23.

As may be understood from the above discussion, according to the present invention, since the separation wall within the cylinder is made of a cup-shaped separation wall member, not only can the manufacturing cost be reduced, but also the multi-stage piston actuator can be made thinner and smaller.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A multi-stage piston actuator comprising:

an operation stem;

a plurality of pistons provided on the operation stem at different axial positions;

a cylinder in which the pistons are slidably fitted; and a separation wall provided within the cylinder, which defines pressure chambers corresponding to the pistons;

wherein said separation wall is made of a cup-shaped member which is provided with a central cylindrical portion in which the operation stem slides, a peripheral cylindrical portion which is fitted in, and secured to, an inner wall surface of the cylinder, and a circular disc portion which connects the central cylindrical portion and the peripheral cylindrical portion.

2. A multi-stage piston actuator according to claim 1, wherein the peripheral cylindrical portion of said cup-shaped separation wall member and the inner wall surface of the cylinder are snugly fitted without a seal member therebetween, so that no air leakage occurs between the peripheral cylindrical portion of the cup-shaped separation wall member and the inner wall surface of the cylinder.

3. A multi-stage piston actuator according to claim 1, wherein said cup-shaped separation wall member is formed by press forming sheet metal.

4. A multi-stage piston actuator according to claim 1, wherein said cup-shaped separation wall member is obtained by cutting a metal material.

5. A double-piston actuator comprising:

a cylinder having of a pair of cylinder bodies;

a separation wall provided within and between the cylinder bodies, said separation wall defining a pair of pressure chambers within the cylinder;

an operation stem located in the axial position of the cylinder; and a pair of pistons provided on the operation stem at different axial positions, each of said pair of pistons being slidably fitted in each respective said pair of pressure chambers;

wherein said separation wall is made of a cup-shaped member which is provided with a central cylindrical portion in which the operation stem slides, a peripheral cylindrical portion which is secured between the pair of cylinder bodies, and a circular disc portion which connects the central cylindrical portion and the peripheral cylindrical portion.

6. A double-piston actuator according to claim 5, wherein the peripheral cylindrical portion of said cup-shaped separation wall member and the inner wall surface of one of the cylinder bodies are snugly fitted without a seal member therebetween, so that no air leakage occurs between the peripheral cylindrical portion of the cup-shaped separation wall member and the inner wall surface of the cylinder body.

7. A double-piston actuator according to claim 5, wherein said cup-shaped separation wall member is formed by press forming sheet metal.

8. A double-piston actuator according to claim 5, wherein said cup-shaped separation wall member is obtained by cutting a metal material.

* * * * *